Feb. 9, 1926.                                                1,572,216
C. MELLINGER
PADDLE STITCHER
Filed April 5, 1924

Inventor
CHARLES MELLINGER.
By A. L. Ely
Attorney.

Patented Feb. 9, 1926.

1,572,216

UNITED STATES PATENT OFFICE.

CHARLES MELLINGER, OF AKRON, OHIO.

PADDLE STITCHER.

Application filed April 5, 1924. Serial No. 704,441.

*To all whom it may concern:*

Be it known that I, CHARLES MELLINGER, a citizen of the United States, and a resident of Akron, county of Summit, State of Ohio, have invented certain new and useful Improvements in Paddle Stitchers, of which the following is a specification.

This invention relates to "stitching" devices used in the manufacture of pneumatic tire casings and particularly to a stitching tool or paddle stitcher used in the hand-building of tires.

In the manufacture of tires, plies of rubberized fabric are applied to a core rotatably mounted on a suitable stand, the plies being stretched over the core and "stitched" into place by various hand or machine operated tools while the core is rotated. Various stitching devices have heretofore been employed, but these are susceptible of improvement in that they are with difficulty held against the surface of fabric on the core while the latter is being rotated and the workman soon becomes fatigued in attempting to properly shape the fabric on the core.

It is the purpose of the present invention to provide a paddle stitcher having a grip handle so formed and so disposed with respect to the "blade" or "edge" of the stitcher that in use the direction of the pressure of the fleshy portion of the hand on the handle will be substantially toward the point of contact of the stitcher with the work.

An important object of the invention is to form a handle so as to provide a cavity in back of the blade which cavity will be adapted to receive the fleshy portion of the hand whereby the latter will be enabled the more easily to withstand "kicking" of the tool as it encounters uneven portions of a rotating tire carcass.

Another object of the invention is to provide a paddle stitcher having "heel" and "toe" portions adapted to be applied at portions of a tire-carcass of various curvatures and to progressively engage fabric plies and stitch them into place on the core.

Other objects will appear from the following detailed description in connection with the accompanying drawings in which the invention is illustrated in its preferred form.

Figure 1:
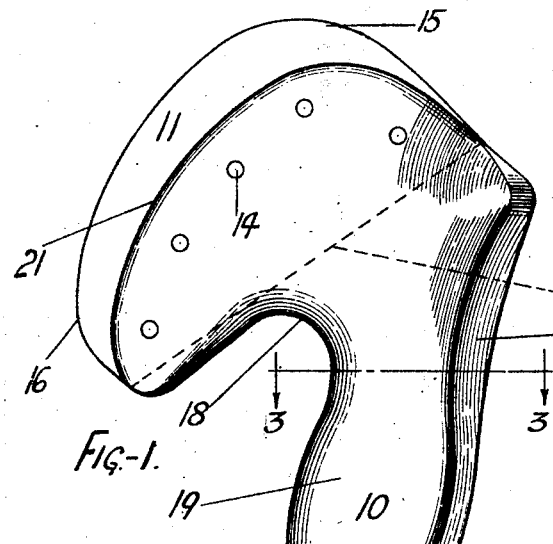
Figure 1 is a side elevation of an embodiment of my invention.
Figure 2:
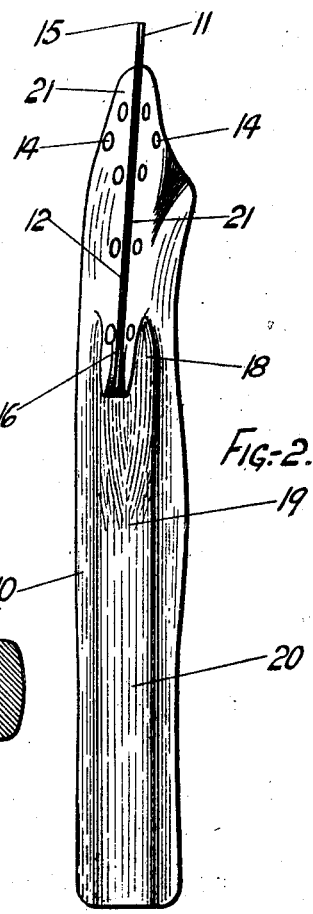
Figure 2 is a left elevation thereof as shown in Figure 1.
Figures 3, 4:
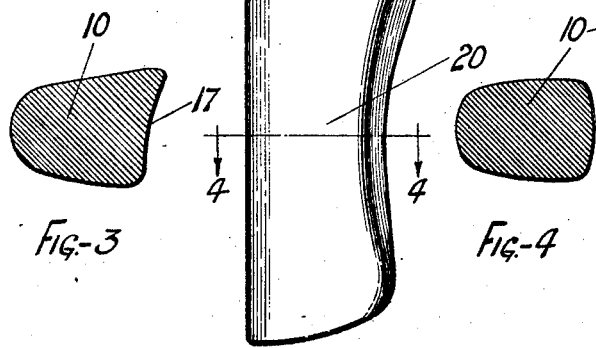
Figure 3 is a section on line 3—3 of Figure 1.
Figure 4 is a section on line 4—4 of Figure 1.
Figure 5:
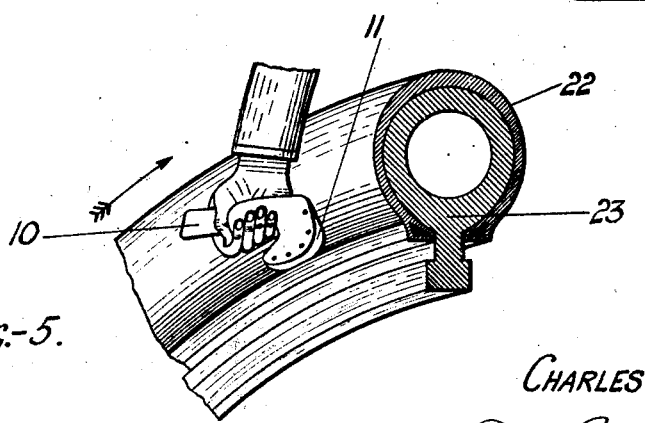
Figure 5 is a diagrammatic view illustrating the manner of using the invention in the hand-building of tires.

Referring to the drawings, 10 represents generally a handle and 11 a blade of a paddle stitcher constructed in accordance with the invention. The blade 11, is preferably of tool steel and formed with a beveled edge 12, the bevel being formed only on the side indicated which is the outer side of the blade as shown in Figure 5. The handle 10 is preferably of cast aluminum, although other metals, wood or plastic materials of suitable nature may be used. The blade 11 is preferably secured to the handle 10 by seating the former in a groove 13 so formed in the handle that the blade will be disposed at a slight angle to the direction of the handle as shown in Figure 2 so as to permit an operator to work the blade in around the bead and riveting it in place by rivets 14, 14. The blade, however, may be integrally molded with the handle or may be otherwise secured thereto as found expedient.

The blade 11, is formed with a "heel" portion 15 of one curvature and a "toe" portion 16 of another curvature so as to adapt the tool to operations against portions of a tire carcass of different curvature.

The handle 10 is formed with a depression 17 adapted to receive the "fleshy" portion of a workman's hands and with a cut-away portion 18 opposite thereto to permit the third and fourth fingers to grasp the handle as shown in Figure 5. The middle portion 19 of the handle is swelled or bulged out from the depression 17 and cut-away portion 18 to provide for the gripping of the handle in the hollow of the hand by the second finger, and the handle has a reduced portion 20 adjacent the end thereof to provide for the gripping of the same by the thumb and index finger. The handle 10 adjacent the blade 11 is beveled down as indicated at 21, 21 so as not to interfere with the operation of the tool on the work.

In operation a carcass, indicated at 22 (Fig. 5) is built on a rotary core 23 by drawing the fabric thereover, as will be understood by those skilled in the art, the fabric being stitched down about the core by the tool in the manner illustrated by the showing in Figure 5, the arrow indicating the direction of rotation of the work with respect to the tool which is securely grasped by the hand of the workman.

Modifications of the invention may be resorted to without departing from the spirit or scope thereof as claimed in the appended claim.

I claim:

A paddle stitcher comprising a curved blade beveled to its edge and a handle to which said blade is secured, said handle being so formed as to provide a seat for the fleshy portion of an operator's hand directly in back of the blade, and having a portion extending at an acute angle to the longitudinal direction of said blade so formed as to enable the workman to retain the fleshy portion of his hand in said seat by grasping said portion of the handle.

CHARLES MELLINGER.